US012053428B2

(12) United States Patent
Chi

(10) Patent No.: US 12,053,428 B2
(45) Date of Patent: Aug. 6, 2024

(54) KNEE STAIR CLIMBER

(71) Applicant: Thomas Chi, Seattle, WA (US)

(72) Inventor: Thomas Chi, Seattle, WA (US)

( * ) Notice: Subject to any disclaimer, the term of this patent is extended or adjusted under 35 U.S.C. 154(b) by 88 days.

(21) Appl. No.: 17/588,271

(22) Filed: Jan. 29, 2022

(65) Prior Publication Data

US 2023/0240931 A1 Aug. 3, 2023

(51) Int. Cl.
*A61H 3/00* (2006.01)

(52) U.S. Cl.
CPC ......... *A61H 3/00* (2013.01); *A61H 2003/001* (2013.01); *A61H 2003/005* (2013.01)

(58) Field of Classification Search
CPC ................ A61H 3/02; A61H 2003/001; A61H 2003/005
See application file for complete search history.

(56) References Cited

U.S. PATENT DOCUMENTS

| | | | | |
|---|---|---|---|---|
| 2,766,813 A | | 10/1956 | Kay | |
| 2,798,533 A | | 7/1957 | Frank | |
| 3,354,893 A | | 11/1967 | Schmerl | |
| 3,455,313 A | | 7/1969 | King | |
| 3,596,668 A | | 8/1971 | Tosto | |
| 3,800,815 A | | 4/1974 | Birk | |
| 4,094,331 A | | 6/1978 | Rozsa | |
| 4,867,188 A | | 9/1989 | Reid | |
| 5,086,798 A | | 2/1992 | Motts | |
| 5,131,494 A | * | 7/1992 | Heifetz | A61H 3/00 182/113 |
| 5,263,506 A | | 11/1993 | Narramore | |
| 5,271,422 A | | 12/1993 | Sorrell | |
| 5,603,517 A | | 2/1997 | Lorman | |
| 5,746,236 A | | 5/1998 | Tilsley | |
| 5,800,317 A | | 9/1998 | Accetta | |
| 5,904,168 A | | 5/1999 | Alulyan | |
| 8,302,974 B2 | * | 11/2012 | Kline | A47C 7/008 135/69 |
| 9,107,503 B2 | * | 8/2015 | Kline | A47C 7/008 |
| 9,375,378 B2 | | 6/2016 | Price | |
| 9,895,281 B1 | * | 2/2018 | Sigsworth | A61H 3/00 |
| 10,434,028 B2 | * | 10/2019 | Barto | E04F 11/02 |
| 10,624,810 B2 | * | 4/2020 | Hunter | A61H 3/02 |
| 2005/0109379 A1 | | 5/2005 | Rader | |
| 2008/0121258 A1 | | 5/2008 | Lin | |
| 2009/0058037 A1 | | 3/2009 | Accetta | |
| 2011/0278808 A1 | | 11/2011 | Kline | |
| 2014/0261587 A1 | * | 9/2014 | Price | A61H 3/00 135/65 |
| 2021/0369538 A1 | * | 12/2021 | Bellin | A61H 3/00 |

* cited by examiner

*Primary Examiner* — Noah Chandler Hawk
(74) *Attorney, Agent, or Firm* — Taylor Dykema PLLC; Keana Taylor

(57) ABSTRACT

The present invention provides an apparatus designed to assist users in ascending or descending stairs. The system preferably includes an apparatus with a handle, a horizontal top surface, side walls, front and rear vertical surface, two horizontal bottom surfaces, and a vertical face between the horizontal bottom surfaces.

15 Claims, 13 Drawing Sheets

KNEE STAIR CLIMBER

TECHNICAL FIELD OF THE INVENTION

The present invention relates, generally, to the field of mobility aid devices. More specifically, the present invention relates to an apparatus to assist users who have conditions of the lower body that make ascending or descending stairs difficult.

BACKGROUND OF THE INVENTION

Injuries to the knees, feet, and lower legs will cause significant inconvenience to daily activities. These conditions are especially challenging when the patient needs to ascend or descend stairs. Many people who are dependent on crutches have a difficult time navigating stairs. The risk of falls and severe injury are considerable, and in the acutely-injured or post-operative patient, these risks are oftentimes compounded by pain, post-operative dizziness, and narcotic usage. Most patients who are concerned about falling scoot up backwards on their buttocks, using their palms to propel them up one step at a time.

Patients need a stable support on the stairs during the process of climbing stairs. In the past, people have tried to implement many apparatuses to assist stair climbing, without success. For example, people have long attempted to use crutches, canes, and other walking devices to assist them in ascending or descending stairs. These devices require substantial upper body strength, full body coordination, and the ability to balance in order to use them on stairs. Additionally, these devices do not provide support or stability to the user's lower body. Some users will report that these devices actually make using stairs more difficult.

Other prior art devices have attempted to address this problem. But those devices are bulker, more complicated, and less comfortable to use.

Accordingly, there remains a need for systems and methods to assist patients to climb stairs.

SUMMARY OF THE INVENTION

The present invention provides a device for assisting physically disabled people to climb stairs more safely and comfortably. The device dramatically reduces weightbearing on the injured lower leg or foot, so the patient can go up and down stairs without additional assistance.

The device of the present invention is portable and provides a substantially stable support on which to rest the lower leg primarily parallel to a step while providing load bearing support to allow the user to ascend or descend stairs without causing pain or exacerbating the user's condition.

In one embodiment, the device is a largely rectangular box that spans two step risers with a handle to lift it up to each successive step. In a preferred embodiment, the vertical sides of the device are arranged to correspond to two steps on the riser, such that when placed on a step, the device fits, and rests on that step and an adjacent step. In the best mode envisioned, the lower-step portion is wide and flat enough to allow it to be stable when on a flat non-step surface, such as a landing.

In the best mode envisioned, the device includes a front vertical wall, a back vertical wall, side walls, and horizontal surfaces. One of ordinary skill in the art, however, would realize that an equivalent device could be constructed without all of these sides, for example, the side walls could be coupled with cross bars or braces to maintain the separation of the side walls to eliminate the needs for the front and back vertical walls, as well as the horizontal surfaces. Similarly, an equivalent device could be constructed from the top and bottom horizontal surfaces utilizing cross bars and braces to replace the vertical walls. In another embodiment, the vertical surfaces include slats or holes designed to decrease device weight or improve maneuverability. In the best mode envisioned, the height of vertical face between the two horizontal bottom surfaces should approximate the height of a typical stair raiser so that when said vertical face is placed against the side wall of a first stair step, the upper-step portion of the device can be placed stably on the top of the next stair step and keep the top horizontal surface substantially parallel to the level.

Current standards require stair risers to be between 6 and 7.5 inches in height. Therefore, typical stair rises are around 7 inches (18 centimeters) tall, though that height varies, especially in historic buildings or buildings that are exempted from or otherwise not compliant with current standards. A typical step is 11 inches in depth. The lower stair portion should be at least as long as the upper stair length, to make standing on the device while on a flat landing more stable.

In one embodiment, the device includes non-slip material on the bottom horizontal surfaces to prevent the device from slipping on stairs. In the preferred embodiment, several non-slip footings are secured to the bottom horizontal surfaces. In the best envisioned mode, said non-slip footings are configured to be adjustable so that the device can be adapted to the height of the stair risers and also so that the device can be adapted so that the top horizontal surface of the device can be maintained substantially parallel to the level when the user is ascending or descending stairs. These adjustments can serve to make the user feel safer and more comfortable, while also increasing the safety of using the device. As an example, when the stair riser is higher than the height of the vertical face between the two horizontal bottom surfaces, then the footings on the upper horizontal bottom surface can be lengthened and the footings on the lower horizontal bottom surface can be shortened. Conversely, when the stair riser is lower than the height of vertical face between the two horizontal bottom surfaces, then the footings on the upper horizontal bottom surface can be shortened and the footings on the lower horizontal bottom surface can be lengthened. These adjustments allow the device to be placed stably on the stairs and the top horizontal surface to be maintained substantially parallel to the level. In another embodiment, the footings are substantially solid planes that are substantially the same size and shape as the two horizontal bottom surfaces. Said footings are attached to the device by a plurality of legs that allow for height adjustment. The preferred mode of this embodiment further includes hardware configured fix the legs at the desired height while also allowing for easy adjustment when desired. Said footings also preferably include non-slip surface on the bottom side.

In one embodiment, the device includes a handle, which can be attached to the side walls or the top surface. Said handle is used for lifting the device so that the device can be placed to the next step or ground. One of ordinary skill in the art would recognize that said handle can be fixed (e.g. stiff handle), flexible (e.g. a rope), or a combination thereof. One of ordinary skill in the art would further understand that said handle can be composes of any combination of stiff or flexible materials. In the best envisioned mode, a flexible rope loop passes through a hole or holes in the body of rigid handle and is attached to the side walls or the top horizontal surface. Said handle and flexible rope loop can be drawn upwardly to lifting the device. The length of the rope can be adjusted to fit the user. One of ordinary skill in the art would understand that the configuration of the handles can vary to help maintain the top horizontal surface substantially parallel to the level and to increase useability. For example, the flexible rope described above could consist of a plurality of loops attached to the side walls or the top horizontal surface and spaced to support the device without it pivoting when lifted from the stairs. In another embodiment, the handle is rigid and attached to the box by pivots on both the right and left vertical sides. In the preferred mode of this embodiment, the top portion of the rigid handle is configured to slide in and out of the lower portion of the rigid handle to adjust the handle height. In the preferred mode of this embodiment, the portion of the handle where the top and bottom portions slide past each other includes a device configured to fix the handle at the desired height. In the preferred mode of this embodiment, the top portion of the rigid handle also includes a pad for the user's hand. In the preferred mode of this embodiment, the lower portion of the rigid handle is configured to adjust the angle of the rigid handle and is further configured to interact with a portion of the body of the device to allow the angle of the rigid handle to be fixed at the desired angle.

Throughout this description, reference is made is to maintain the top horizontal surface substantially parallel to the level. One of ordinary skill in the art would appreciate that the degree of desired variance from parallel will vary depending on the user's condition. In some cases, the user's comfort may dictate that the knee joint be slightly extended or adducted from the parallel. Similarly, medical advice received by the user may suggest variance from parallel to avoid exacerbating an injury or other medical condition.

In the preferred embodiment, the device is preferably provided with a knee pad on the top horizontal surface for cushioning the knee or lower leg when kneeling on the top horizontal surface to increase user comfort. In another embodiment, the top horizontal surface includes a portion that is recessed or removed to allow space for a pad and, in a preferred embodiment, for the user's knee and lower leg to rest partially below the top plane of the top horizontal surface, in order to provide additional stability for the user's lower leg. In the best mode envisioned, said pad is removable.

Any suitable type of material which embodies the features of the invention may alternatively be employed. The construction of the present invention is preferably constructed of a lightweight, strong material, which can be wood, plastic, aluminum, alloy steel or other material. The padding materials can be foam, cotton, wool, polyester fiber, or any other suitable material.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Furthermore, one of ordinary skill in the art would understand that features of the different embodiments can be interchanged with features from another embodiment as desired. Any equivalent examples are intended to be within the scope of the specification and the invention. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking may be advantageous. Moreover, the separation of various components in the embodiments described above should not be understood as requiring such separation in all embodiments, and it should be understood that the described components can generally be integrated together in a single product.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

The preferred embodiment of the present invention provides a device having a plurality of vertical side walls, a top horizontal surface, a front and back vertical surface, a plurality of horizontal bottom surfaces, including an upper horizontal bottom surface and a lower horizontal bottom surface, along with a vertical face between the upper and lower horizontal bottom surfaces. The preferred embodiment of the present invention further provides a plurality of non-slip surfaces on the horizontal bottom surfaces, a pad on the horizontal top surface, and at least one handle attached to the device.

Figure 1:
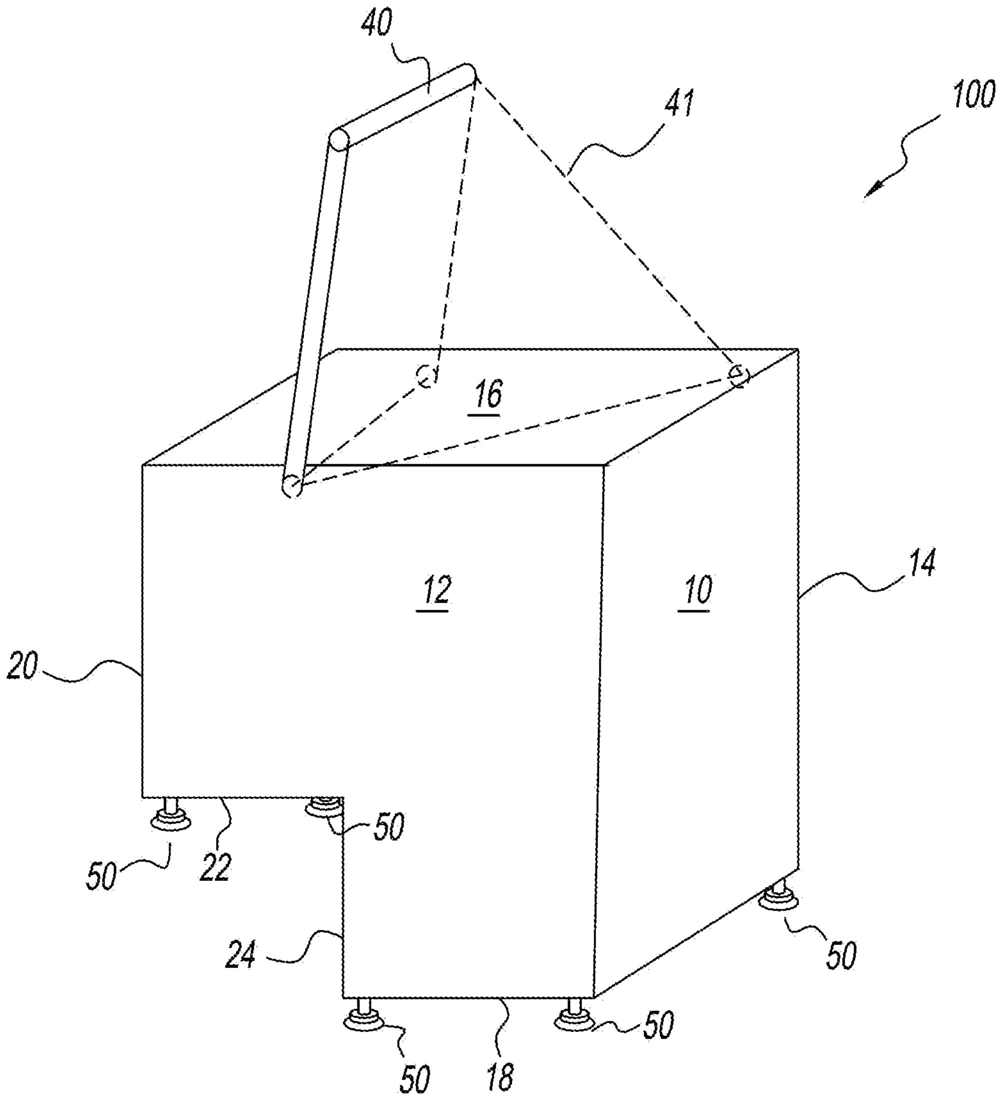
FIG. 1 is an illustration of the left orthogonal view of a first embodiment of the device.

For illustrative purposes, the relative size of components and the relative distances between components are not depicted to scale in FIGS. 1 through 4. Referring now to FIG. 1, one embodiment of the present invention is provided as an illustrative example.

FIG. 1 is the left orthogonal view showing the structure of device in a preferred embodiment. The device 100 is a substantially rectangular box that spans two step risers with a handle to lift it up to each successive step. The lower-step portion is wide and flat enough to allow it to be stable when on a flat non-step surface, such as a landing. The device 100 includes a rear vertical surface 10, front vertical surface 20, side walls 12 and 14, horizontal top surface 16, upper horizontal bottom surface 22, lower horizontal bottom surface 18, and vertical face 24. The height of vertical face 24 should be close to the height of the stair raiser so that when the vertical face 24 is placed against the side wall of a first stair step, the upper-step portion of the device 100 can be placed stably on the top of the next stair step and keep the horizontal top surface 16 substantially parallel to the level. In the best mode envisioned, the lower horizontal bottom surface 18 is wide and flat enough to allow it to be stable when on a flat non-step surface, such as on a landing or on the ground. In the best mode envisioned, it is further envisioned that the lower horizontal bottom surface 18 will be at least as long as the upper horizontal bottom surface 22, to make standing on the device 100 while on a flat landing more stable.

The device 100 also includes several non-slip footings 50 secured to the horizontal bottom surfaces 18 and 22, as shown in the FIGS. 1-4. While standard stair rises are around 7 inches (18 centimeters) tall, they vary in height. In the preferred embodiment, the height of the non-slip footings 50 can be adjusted so that the device 100 could be adapted to the various height of the stair risers and thus the horizontal top surface 16 of the device 100 is maintained substantially parallel to the level when climbing up and down stairs, which increased safety of use and makes the user feel more comfortable. When the stair riser is higher than the height of the vertical face 24, then the footings on the lower horizontal bottom surface 18 can be lengthened and the footings 50 on the upper horizontal bottom surface 22 shortened.

Conversely, when the stair riser is lower than the height of vertical face 24, the footings on the lower horizontal bottom surface 18 can be shortened and the footings 50 on the upper horizontal bottom surface 22 can be lengthened, so that device 100 can be placed stably on the stairs and the horizontal top surface 16 is substantially parallel to the level.

The device 100 also includes a handle 40, which can be attached to the side walls 12 and 14 or the horizontal top surface 16. Said handle 40 is used for lifting the device 100 so that the device 100 can be placed to the next step or ground. One of ordinary skill in the art would recognize that said handle 40 can be fixed (e.g. stiff handle), flexible (e.g. a rope), or a combination thereof. One of ordinary skill in the art would further understand that said handle can be composes of any combination of stiff or flexible materials. In the best envisioned mode, a flexible rope loop 41 passes through a hole or holes in the body of rigid handle 40 and is attached to the side walls 12 and 14 or the horizontal top surface 16. Said handle 40 and flexible rope loop 41 can be drawn upwardly to lifting the device 100. The length of the rope 41 can be adjusted to fit the user. One of ordinary skill in the art would understand that the configuration of the handles 40 and rope loops 41 can vary to help maintain the top horizontal surface 16 substantially parallel to the level and to increase useability. For example, the flexible rope loop 41 described above could consist of a plurality of loops attached to the side walls 12 and 14 or the horizontal top surface 16 and spaced to support the device 100 without it pivoting when lifted from the stairs.

In the preferred embodiment, the device 100 is preferably provided with a knee pad 30 on the horizontal top surface 16 for cushioning the knee or lower leg when kneeling on the horizontal top surface 16 to increase user comfort. In the best mode envisioned, said pad 30 is removable.

Figure 2:
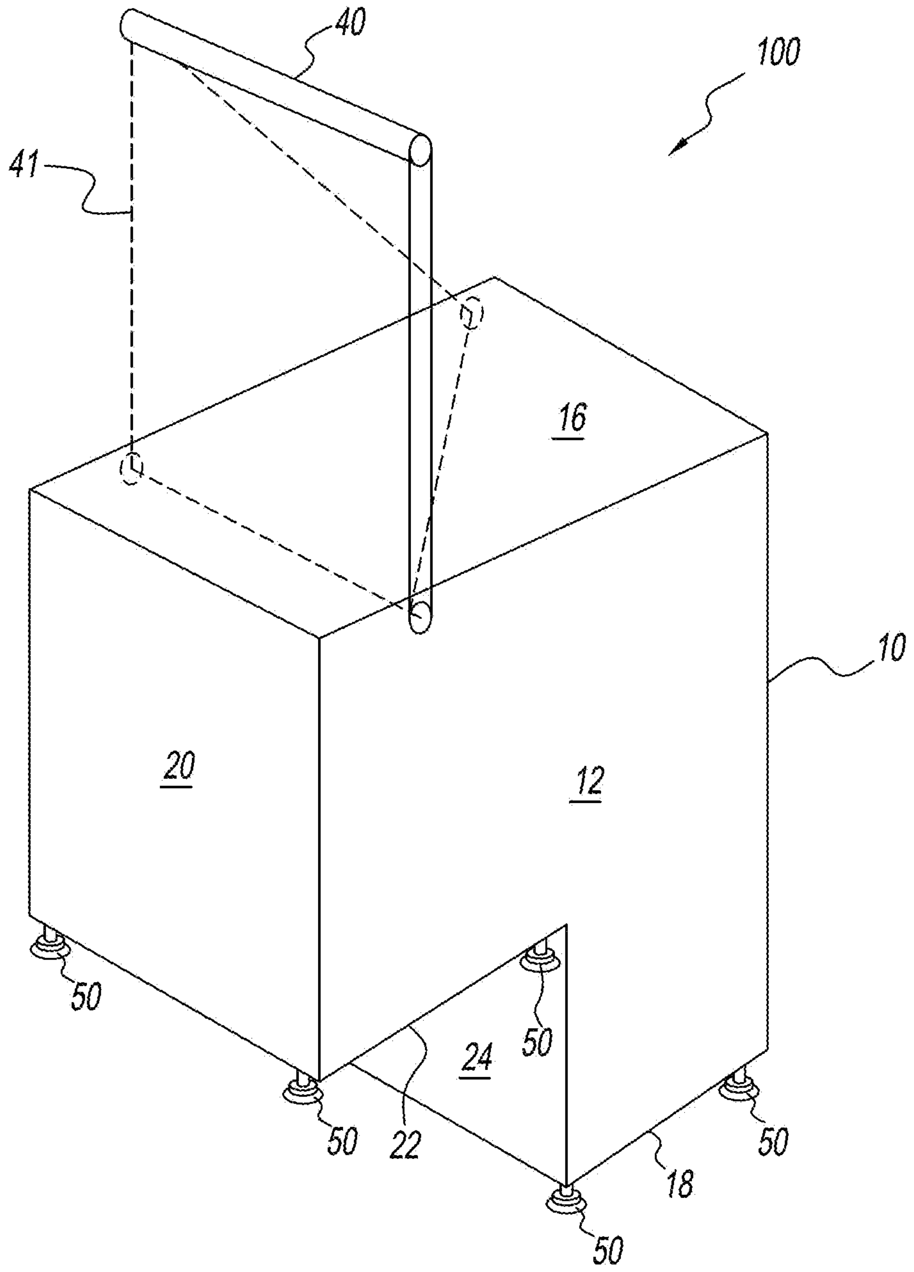
FIG. 2 is an illustration of the front orthogonal view of a first embodiment of the device.

Referring now to FIG. 2, one embodiment of the present invention is provided as an illustrative example. FIG. 2 is the front orthogonal view showing the structure of device 100 in a preferred embodiment. All component parts are the same as described above in FIG. 1.

Figure 3:
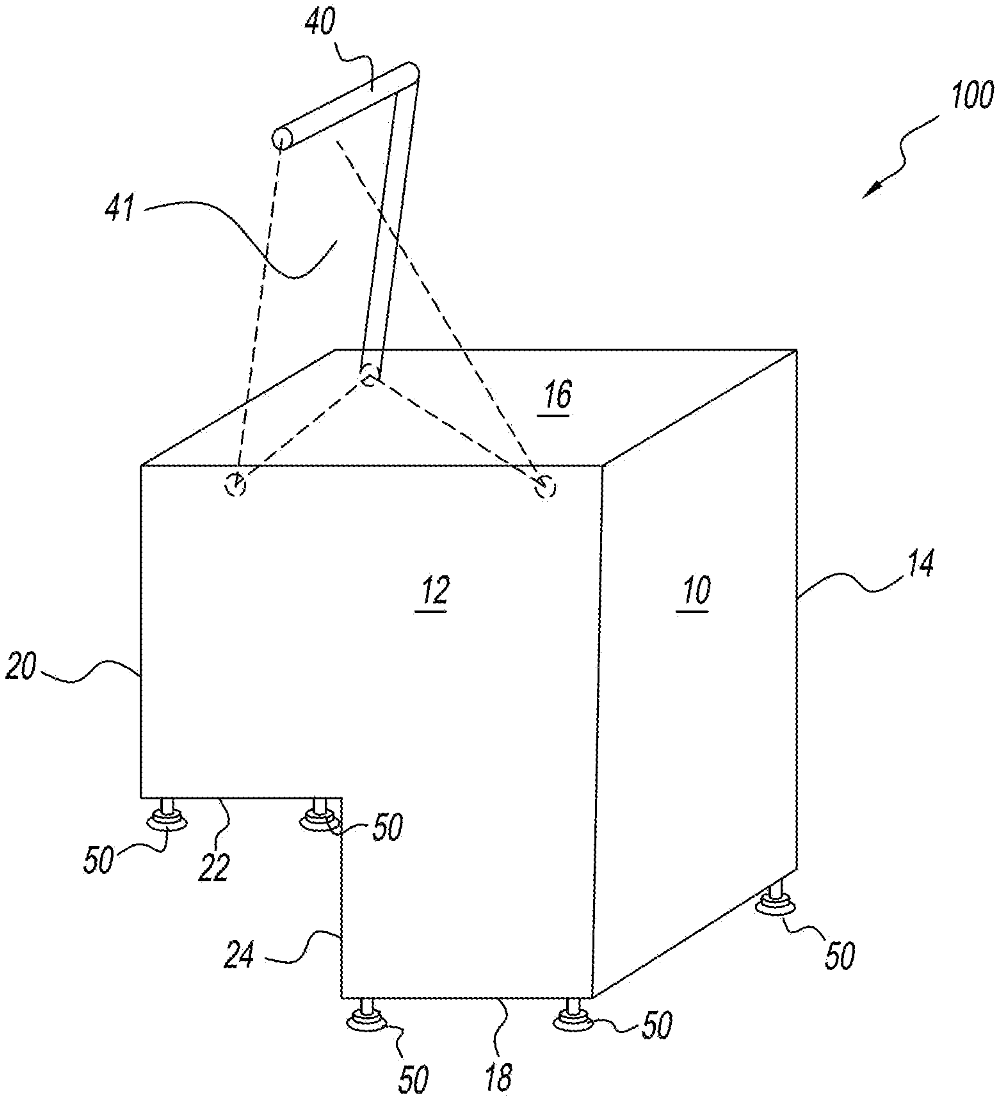
FIG. 3 is an illustration of the left orthogonal view of a first embodiment of the device.

Referring now to FIG. 3, one embodiment of the present invention is provided as an illustrative example. FIG. 3 is the rare orthogonal view of the device 100, showing the device 100 positioned on a flight of stairs. In FIG. 3, the device 100 is placed adjacent to the stairs. The vertical face 24 is placed against the side wall of a first stair step, the lower horizontal bottom surface 22 is placed on the top of the next stair step and the front vertical surface 20 is against the side wall of the next stair step, so the device 100 is stably placed on the stairs and the horizontal top surface 16 is substantially parallel to the level.

Figure 4:
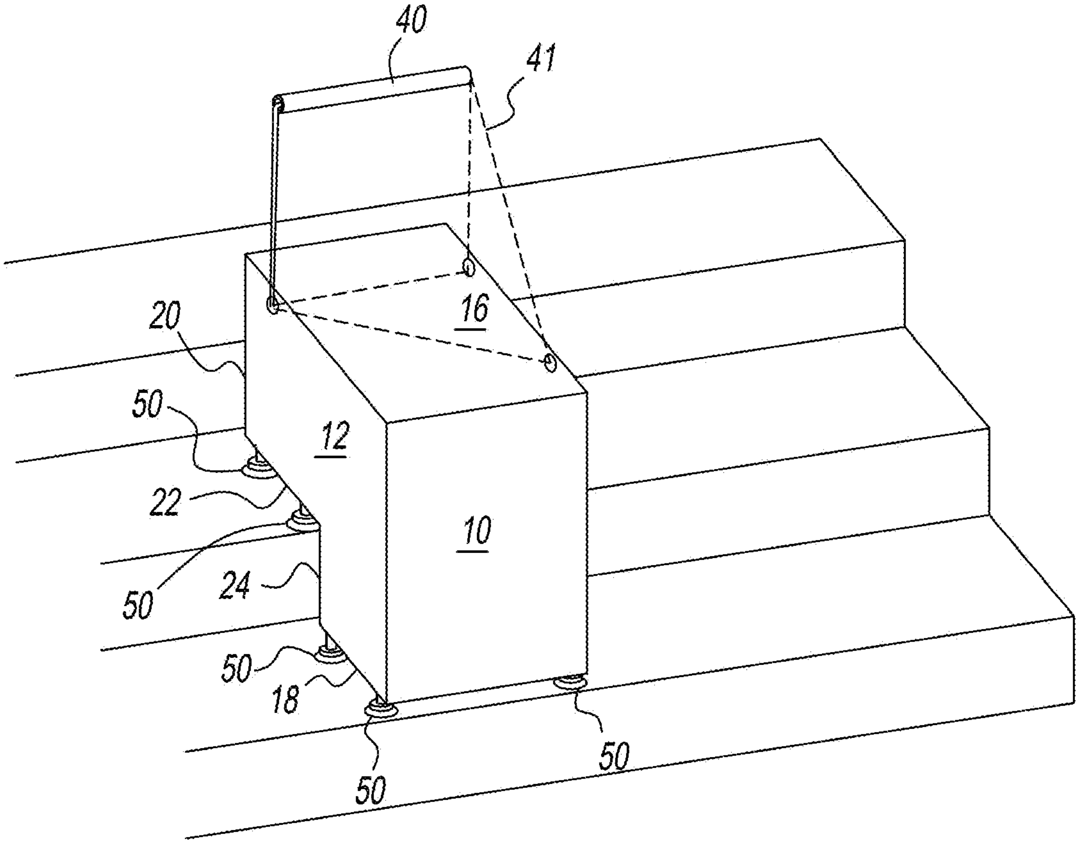
FIG. 4 is an illustration of the rear orthogonal view of a first embodiment of the device, showing the device positioned on a flight of stairs.
Figure 5:
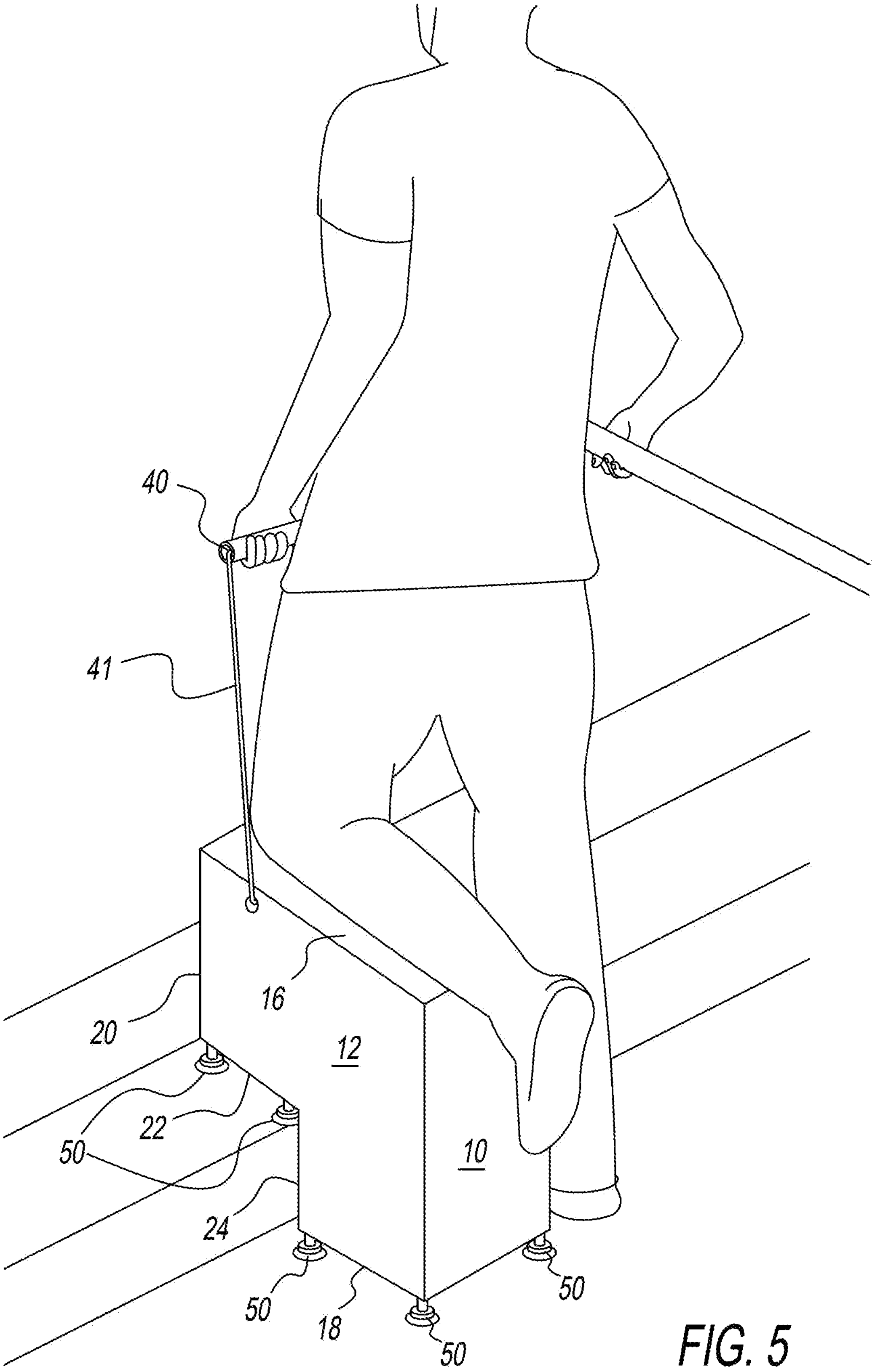
FIG. 5 is an illustration of the rear orthogonal view of a first embodiment of the device, showing a user utilizing the device to ascend or descend a flight of stairs.
Figure 6:
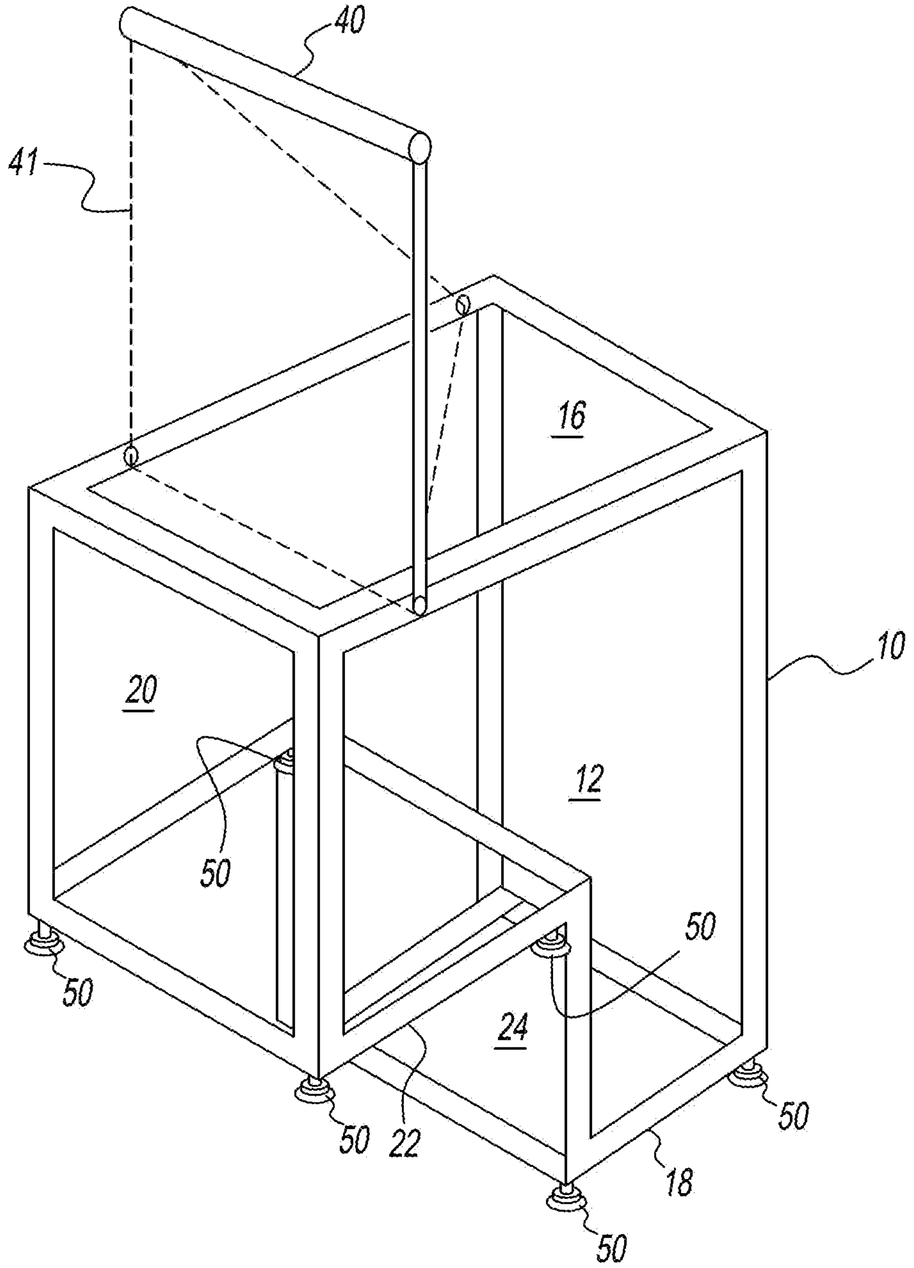
FIG. 6 is an illustration of the left orthogonal view of a first embodiment of the device showing a cut away view allowing visualization of a through view of the device.

Referring now to FIG. 4, one embodiment of the present invention is provided as an illustrative example. FIG. 4 is an illustration of the left orthogonal view of the device 100, showing a user utilizing the device 100 to ascend or descend a flight of stairs. In FIG. 3, the device 100 is placed adjacent to the stairs with a user resting a knee and lower leg on the horizontal top surface 16. The vertical face 24 is placed against the side wall of a first stair step, the lower horizontal bottom surface 22 is placed on the top of the next stair step and the front vertical surface 20 is against the side wall of the next stair step, so the device 100 is stably placed on the stairs and the horizontal top surface 16 is substantially parallel to the level.

When ascending stairs, the user can place the device 100 stably on the stairs as illustrated in FIGS. 3 and 4, with the lower horizontal surface 18 of the device 100 placed on the ground or a first step while the upper horizontal surface 22 of the device 100 placed on the next stair step. The user can stand on the ground or stairs with his or her stronger leg and place his or her injured leg on the horizontal top surface 16 of the device 100. The user grasps the handle 40 with, preferably, the hand on the same side of the injured leg to lift the device 100 and place it on the next higher stair step, while holding the handrail of the stairs with the other hand if a handrail is available. The user then raises the stronger leg to the same stair step. The user can repeat this process until reaching the end of the stairs.

When descending the stairs, the process is similar. The user can first rest the knee and lower leg on the horizontal top surface 16 of the device 100 and step down with the stronger leg first, then lift the device 100 with one hand by grasping the handle 40 and place the device 100 on the next lower stair step while holding the handrail of the stairs with the other hand if a handrail is available. The user can repeat this process until reaching the end of the stairs.

Figure 7:
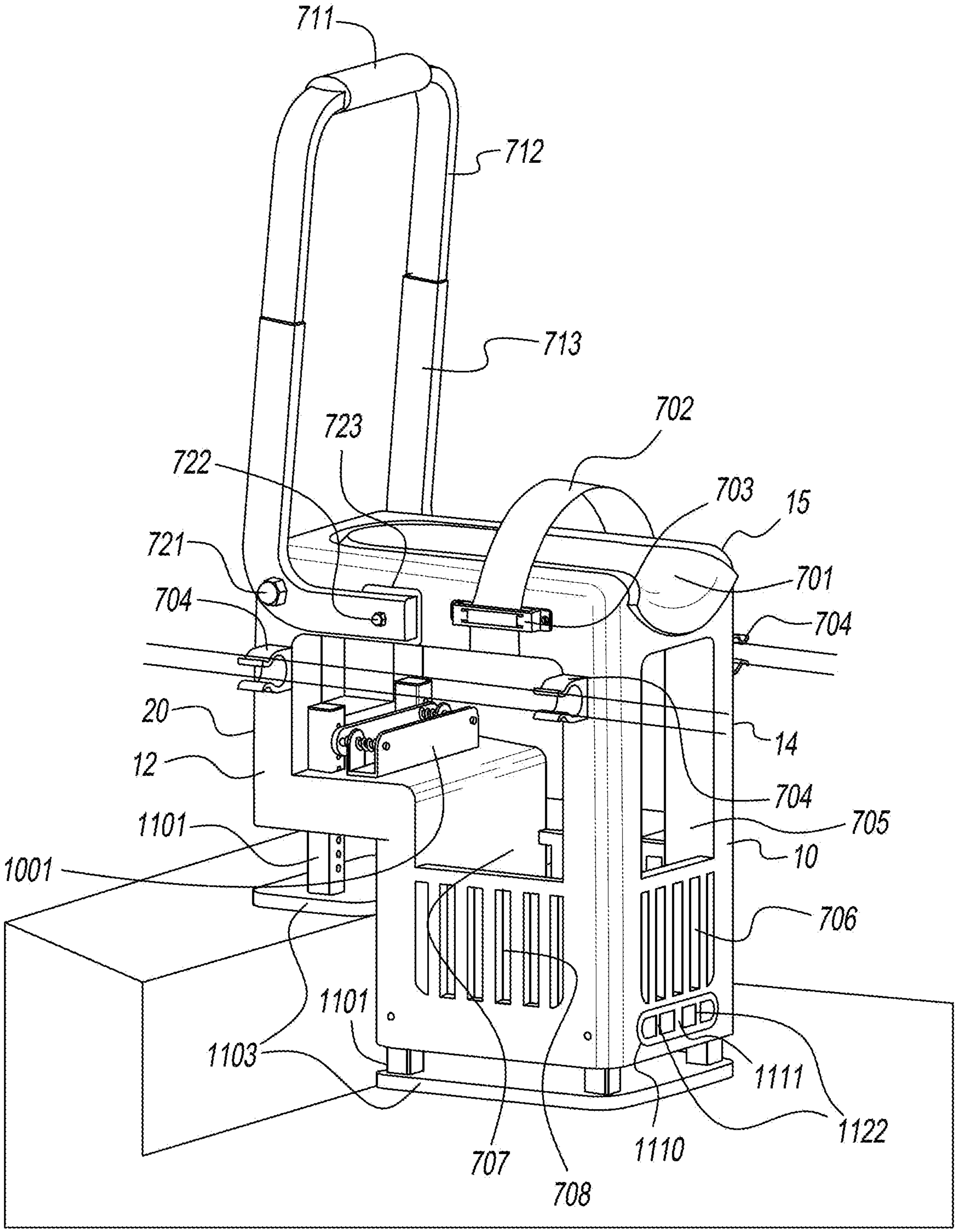
FIG. 7 is an illustration of the left orthogonal view of a second embodiment of the device, showing the device positioned on a flight of stairs.

Referring now to FIG. 7, a second embodiment of the present invention is provided as an illustrative example. FIG. 7 is the left orthogonal view showing the structure of a second embodiment of the device in a preferred embodiment. The device 100 is a substantially rectangular box that spans two step risers with a handle to lift it up to each successive step. The lower-step portion is wide and flat enough to allow it to be stable when on a flat non-step surface, such as a landing. The device 100 includes a rear vertical surface 10, front vertical surface 20, side walls 12 and 14, horizontal top surface 16, upper horizontal bottom surface 22, lower horizontal bottom surface 18, and vertical face 24. The height of vertical face 24 should be close to the height of the stair raiser so that when the vertical face 24 is placed against the side wall of a first stair step, the upper-step portion of the device 100 can be placed stably on the top of the next stair step and keep the horizontal top surface 16 substantially parallel to the level. In the best mode envisioned for this embodiment, the vertical sides include open spaces 705, 706, 707, and 708. Said open spaces configured to decrease the weight and increase the maneuverability of the device 100.

In the best mode envisioned, the lower horizontal bottom surface 18 and upper horizontal bottom surface 22 are connected to feet 1103 that provide for stability and slip resistance on a landing, a step, or on the ground.wide and flat enough to allow it to be stable when on a flat non-step surface, such as on a landing. Said feet 1103 and connecting and adjusting elements 1101, 1110, 1111, and 1122 are described in more detail below. or on the ground. In the best mode envisioned, it is further envisioned that the foot 1103 connected to the lower horizontal bottom surface 18 will be at least as long as the lower horizontal bottom surface 18, to make standing on the device 100 while on a flat landing more stable. It is further envisioned that the foot 1103 connected to the upper horizontal bottom surface 22 is sized to allow the device 100 to rest securely on a step when ascending or descending steps.

The device 100 also includes a handle. One of ordinary skill in the art would appreciate that said handle could be solid. In the preferred embodiment, said handle consists of a top handle portion 712 and a lower handle portion 713. Said handle 40 is used for lifting the device 100 so that the device 100 can be placed to the next step or ground. In the best mode envisioned, the handle includes a hand grip pad 711 attached to the top handle portion 712. In the best mode envisioned, the top handle portion 712 is configured to telescope into the bottom handle portion 713 to allow adjustment of the height of the handle. One or ordinary skill in the art would appreciate that the telescoping configuration could be reversed or the two handle portions could be configured in any other manner that allows adjustment of the height of the handle to the height desired by the user. In the best mode envisioned, the bottom handle portion 713 is connected to the device by a pivots 721 on the left vertical side 12 and the right vertical side 14. Said pivots 721 are configured to allow the bottom handle portion to be pivoted to adjust the angle of the handle, which can be attached to the side walls 12 and 14 or the horizontal top surface 16. In the best mode envisioned, the bottom handle portion further contains a fixing mechanism 722 configured to interface with an adjustment plate 723 attached to the left vertical side 12 or right vertical said 14 or both in a manner to fix the angle of the handle. Said fixing mechanism 722 is well known is the art and can consist of a large number of items, including but not limited to a pin, a screw, a nail, a dowel or any other piece that one of ordinary skill in the art would understand is suitable to interface with said adjustment plate 723. One of ordinary skill in the art would understand that the configuration of the top handle portion 712, the bottom handle portion 713 and the fixing mechanism 722 and adjustment plate 723 can vary to help maintain the top horizontal surface 16 substantially parallel to the level and to increase useability.

In the preferred embodiment, the device 100 is preferably provided with a knee pad 701 on the horizontal top surface 16 for cushioning the knee or lower leg when kneeling on the horizontal top surface 16 to increase user comfort. In the best mode envisioned, said pad 701 is removable. In the best mode envisioned, the horizontal top surface 16 includes a cut out or other depression allowing the pad, and preferably a portion of the user's knee and lower leg, to lay partially below the uppermost surface of the horizontal top surface 16 to increase comfort and stability for the user. In the best mode envisioned, the device 100 further includes a strap 702 attached to the device 100 by a holder 703 configured to allow adjustment of the strap 702 while also holding the strap 702 in substantially the desired position during use. Such holders 703 are well known in the art and come in a large number of configurations, including but not limited to clips, buckles, hooks, magnets, sliding adjustors, snaps, hook and loop fasteners, or any other device suitable for holding the strap 702 while also allowing it to be easily adjusted or removed by the user. One of ordinary skill in the art would select the holder 703 from these or a near limitless number of options to fit the desired configuration and use. In an optional embodiment, the device 100 may also include clamps 704 on the left and right horizontal sides 12 and 14 to allow the device 100 to be more easily moved or stored when not in use, or to hold the handle in at a fully collapsed angle for transportation and storage.

Figure 8:
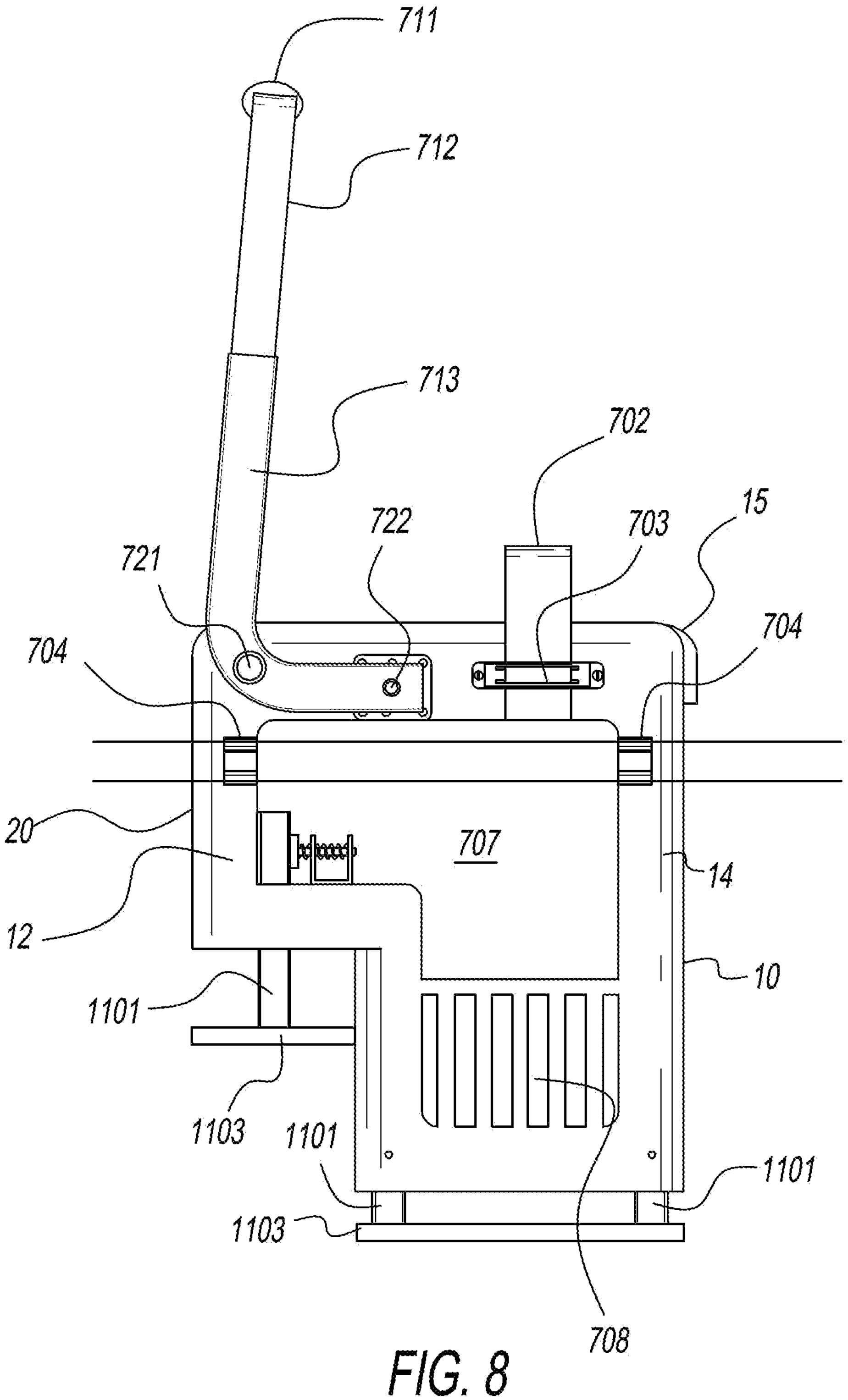
FIG. 8 is an illustration of the left side view of a second embodiment of the device.

Referring now to FIG. 8, one embodiment of the present invention is provided as an illustrative example. FIG. 8 is the left side view showing the structure of the second embodiment of device 100 in a preferred embodiment. All component parts are the same as described above in FIG. 7.

Figure 9:
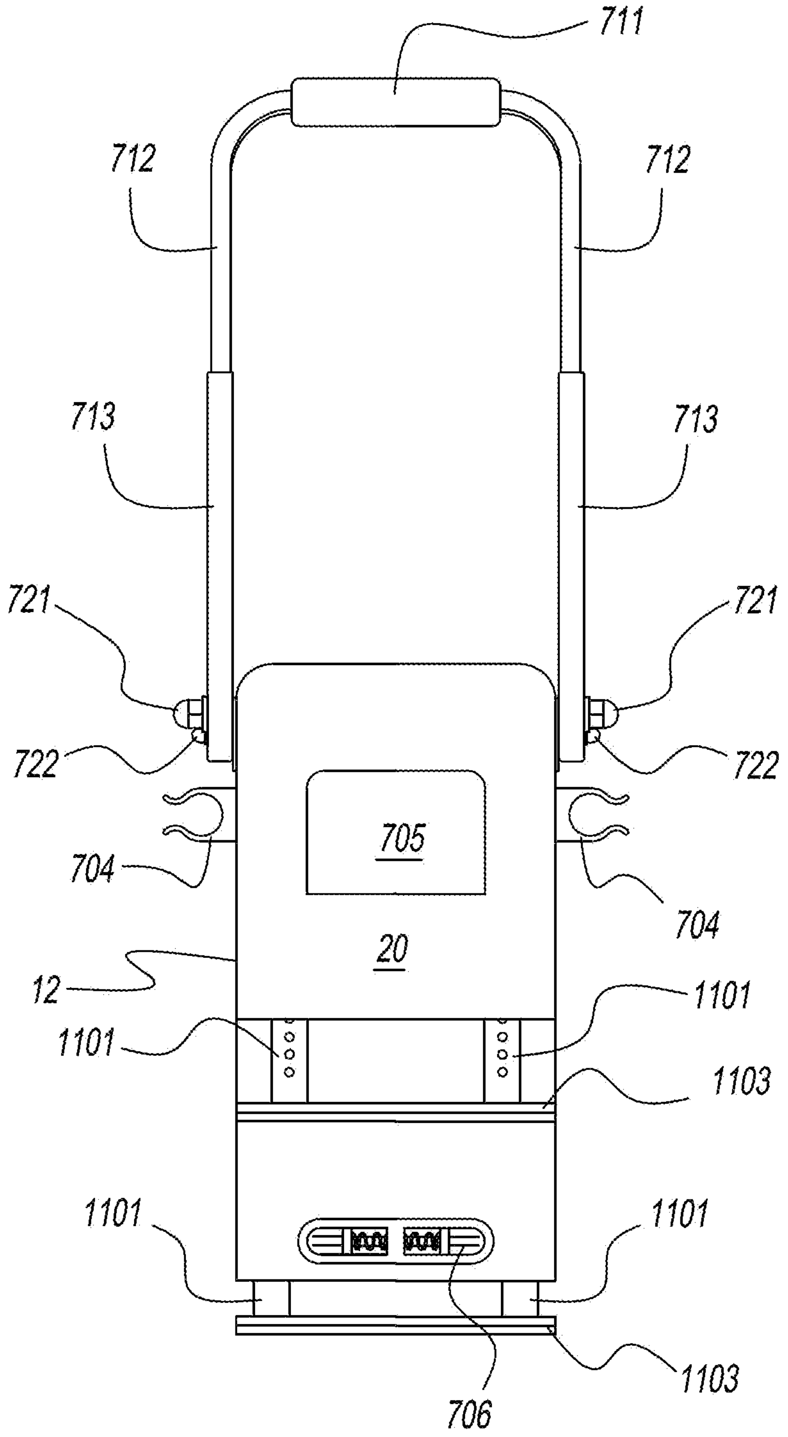
FIG. 9 is an illustration of the front view of a second embodiment of the device.

Referring now to FIG. 9, one embodiment of the present invention is provided as an illustrative example. FIG. 9 is the front view showing the structure of the second embodiment of device 100 in a preferred embodiment. All component parts are the same as described above in FIG. 7.

Figure 10:
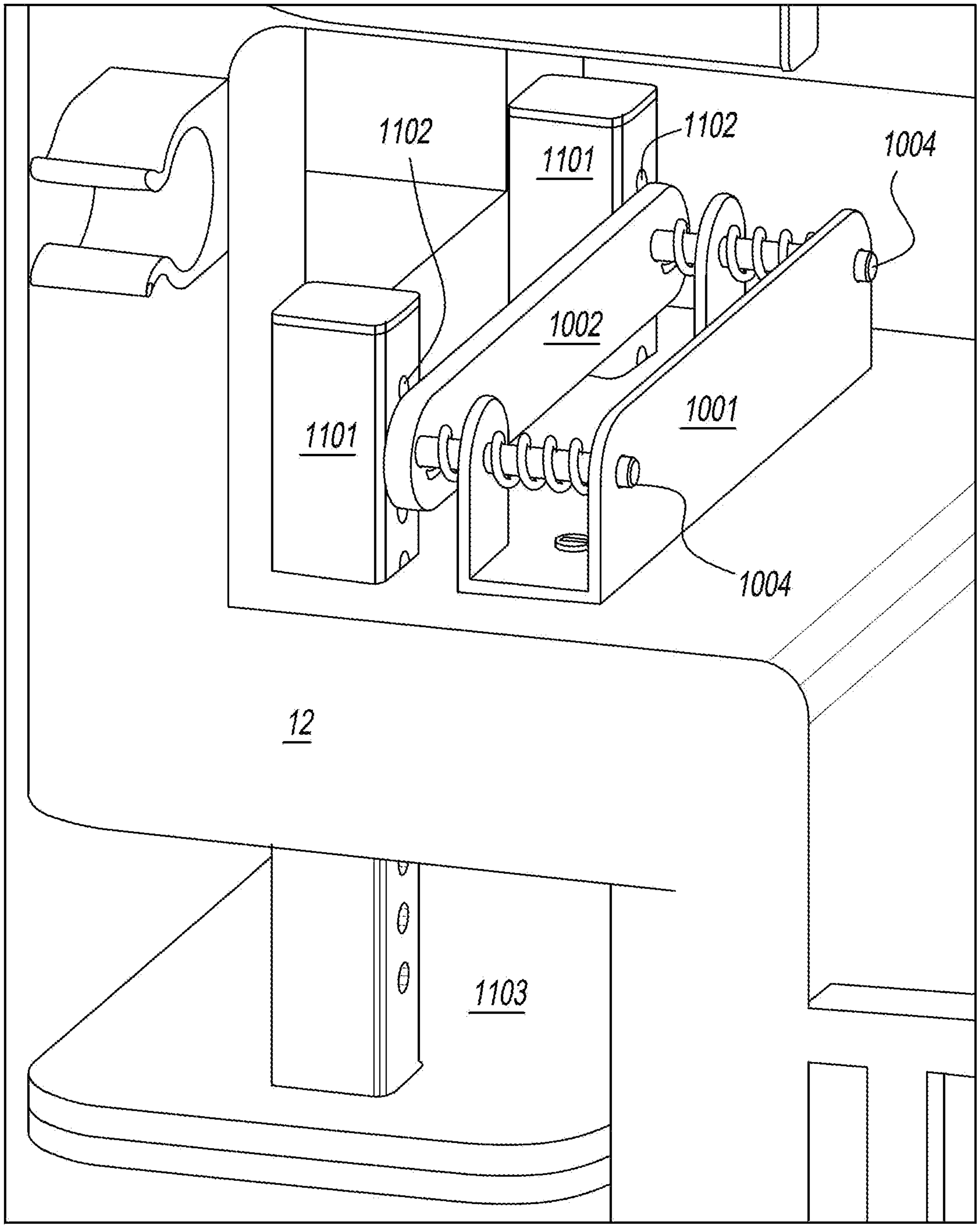
FIG. 10 is an illustration of the left orthogonal view of height adjustment clamp of a second embodiment of the device.

Referring now to FIG. 10, one embodiment of the present invention is provided as an illustrative example. FIG. 10 is a left orthogonal view of a first configuration of one of the feet 1103 along with a first embodiment of one of the height adjustment clamp structures. Said structure is configured to allow easy adjustment of the height of the legs 1101 while maintaining side height when the device 100 is in use. The best mode envisioned, the legs 1101 include a series of holes 1102 spaced along the height of said legs 1101. Said holes 1102 are sized and configured to interface with the pins 1003 of the height adjustment clamp structure. In this first configuration, the holes 1102 are on the front or back side of the legs 1101 and said height adjustment clamp structure is positioned in front or back of the legs 1101. When the device is in use and the structure is engaged to maintain the device 100 at a constant height, the pins 1003 are inserted into the holes 1102 to substantially prevent the legs 1101 from moving up or down relative to the position of the pins 1003. This configuration is referred to as the locked configuration. Said pins 1003 are attached to a moveable plate 1002 and slide through a fixed plate 1001. When the user desires to adjust the height of the device 100, the user squeezes the moveable plate 1002 toward the fixed plate 1001, this movement causes the pins 1003 to be removed from the holes 1102 so that the height of the legs 1101 can be adjusted. When the legs are at their desired height, the user releases the moveable plate 1002. Springs 1004 are configured to help return the moveable plate 1002 to its locked configuration when it is released.

Figure 11:
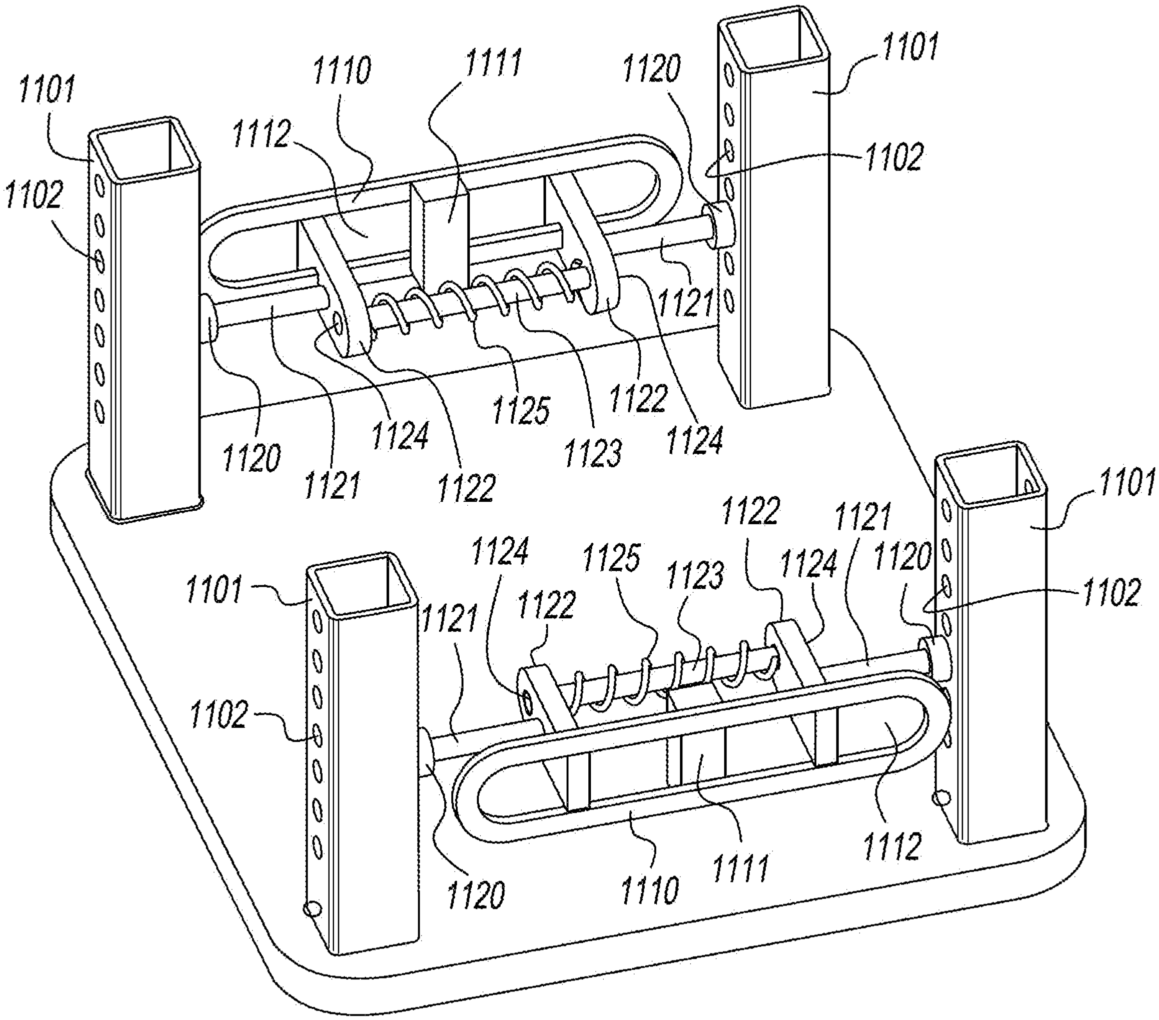
FIG. 11 is an illustration of the rear orthogonal view of the foot and height adjustment structure of a second embodiment of the device.

Referring now to FIG. 11, one embodiment of the present invention is provided as an illustrative example. FIG. 11 is a left orthogonal view of a second configuration of one of the feet 1103 attached to a second configuration of the height adjustment clamp structures. Said structure is configured to allow easy adjustment of the height of the legs 1101 while maintaining side height when the device 100 is in use. The best mode envisioned, the legs 1101 include a series of holes 1102 spaced along the height of said legs 1101. Said holes 1102 are sized and configured to interface with the pins 1003 of the height adjustment clamp structure. In this first configuration, the holes 1102 are on the left or right side of the legs 1101 and said height adjustment clamp structure is positioned between the legs 1101. When the device is in use and the structure is engaged to maintain the device 100 at a constant height, the pins 1120 are inserted into the holes 1102 to substantially prevent the legs 1101 from moving up or down relative to the position of the pins 1003. This configuration is referred to as the locked configuration. Said pins 1120 are connected to a rod 1121 that further connected to a moveable plate 1122. Said moveable plate is slideably attached to the frame 1110 of an access port. Said frame 1110 encloses an open access space 1112 and may be further supported by a brace 1111. When the user desires to adjust the height of the device 100, the user moves the moveable plates 1122 toward one another. When the moveable plates 1122 are moved toward one another, they case the rods 1121 to case the pins 1120 to come out of the holes 1102 to allow the legs 1101 to moved to adjust the height of the legs 1101 and the position of the foot 1103. The other of the moveable plate contains at least one hole 1124. As the moveable plates 1122 move toward one another, a peg 1123 moves through the hole as a spring 1125 is compressed. When the legs are at their desired height, the user releases the moveable plate 1122. Springs 1125 are configured to help return the moveable plate 1122 to its locked configuration when it is released.

Though FIG. 10 and FIG. 11 are described herein as alternative configurations, one of ordinary skill in the art will understand that the structures and features described in each and be interchanged with structures and features of the other configuration or with other structures and features from other locking devices as desired for a particular embodiment of the invention.

In the best mode envisioned of the second embodiment, the device 100 also includes a non-slip surface on the bottom of the footings 1103.

Figure 12:
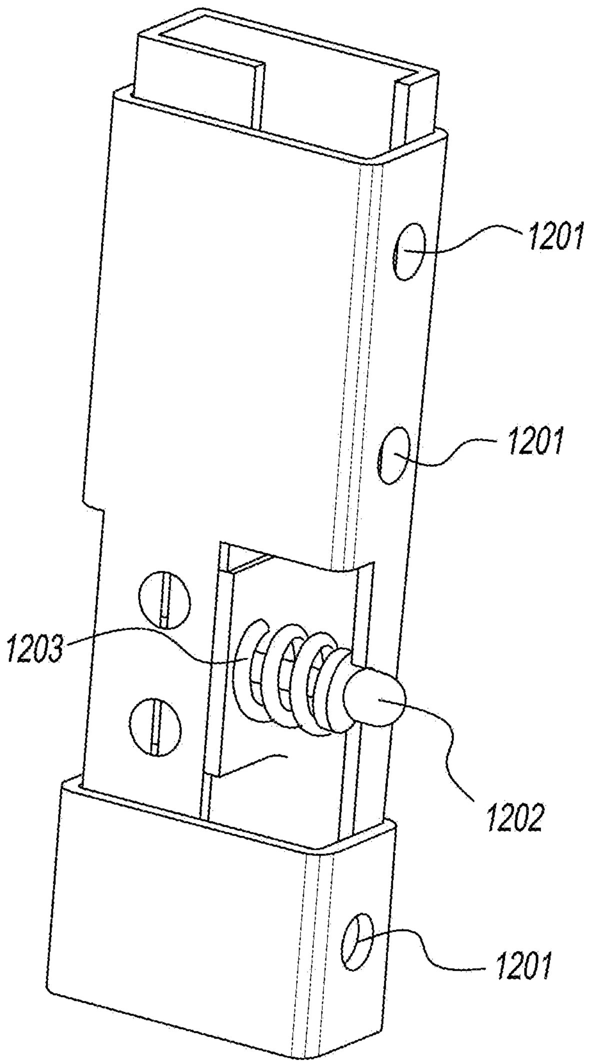
FIG. 12 is an illustration of the cut away view of the handle adjustment mechanism of a second embodiment of the device showing a cut away view allowing visualization of a through view of the device

Referring now to FIG. 12, one embodiment of the present invention is provided as an illustrative example. FIG. 12 is a cross-sectional view of one embodiment of the height adjustment mechanism for the handle of the device 100. In the best mode envisioned, the top handle portion 712 and the bottom handle portion 713 are configured with a series of holes 1201. When the device is in use and the structure is engaged to maintain the handle of the device 100 at a constant height, a pin 1202 extends through the holes 1201 in both the top handle portion 712 and the bottom handle portion 713. Said pin 1202 substantially fixes the height of the top handle portion 712 relative to the bottom handle portion 713 to substantially prevent the top handle portion 712 and the bottom handle portion 713 from moving up or down relative to the position of the pin 1202 or the other handle portion. This configuration is referred to as the locked configuration. When the user desires to adjust the height of the handle of the device 100, the user depresses the pin 1202 through the holes 1201. Said action compresses a spring 1203 connected to the pin 1202. When the pin is depressed through at least the outer hole 1201, it allows the top handle portion 712 to move in or out relative to the bottom handle portion 713 to adjust the height of the handle of the device 100. When the handle of the device 100 is at its desired height, the user releases the pin 1202. The springs 1203 is configured to help return the pin 1202 to its locked configuration when it is released.

Figure 13:
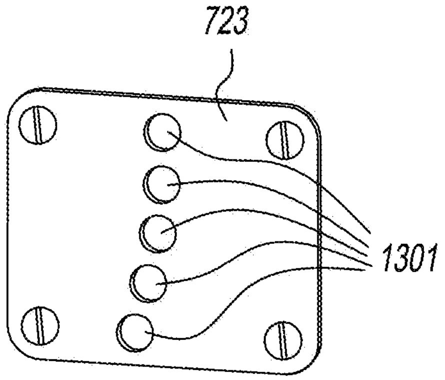
FIG. 13 is an illustration of the side view of the handle angulation mechanism of a second embodiment of the device.

Referring now to FIG. 13, one embodiment of the present invention is provided as an illustrative example. FIG. 13 is a side view of one embodiment of the adjustment plate 723 for the handle of the device 100. In the best mode envisioned, said adjustment plate 723 is configured with a series of holes 1301. When the device is in use and the structure is engaged to maintain the handle of the device 100 at a constant angel, a fixing mechanism 722 extends through the bottom handle portion 713 into the holes 1301 of said adjustment plate 723. Said fixing mechanism 722 substantially fixes the angle of the bottom handle portion 713, and therefore the top handle portion 712, relative to the body of the device 100 to substantially prevent the handle of the device 100 from moving angularly relative to the body of the device 100. This configuration is referred to as the locked configuration. When the user desires to adjust the angle of the handle of the device 100, the user disengages the fixing mechanism 722 from the holes 1301. When the fixing mechanism 722 is disengaged, the handle can move around the pivot 721 to adjust the angle of the handle relative to the body of the device 100.

When the handle of the device 100 is at its desired angle, the user reengages the fixing mechanism 722 with the holes 1301. This returns the fixing mechanism to its locked configuration. One of ordinary skill in the art would understand that the plate 723 could be eliminated and the holes could be placed directly on the body of the device 100. One of ordinary skill in the art would also understand that both the fixing mechanism 722 and the plate 723 could be selected from a large number of well-known and commercially available devices. One of ordinary skill in the art would also understand that the fixing mechanism 722, plate 723, and holes 1301 could be eliminated through various fixing structures on the pivot 721, including teeth, tightening mechanisms, or any combination of structures described in previous Figures above.

Figure 14:
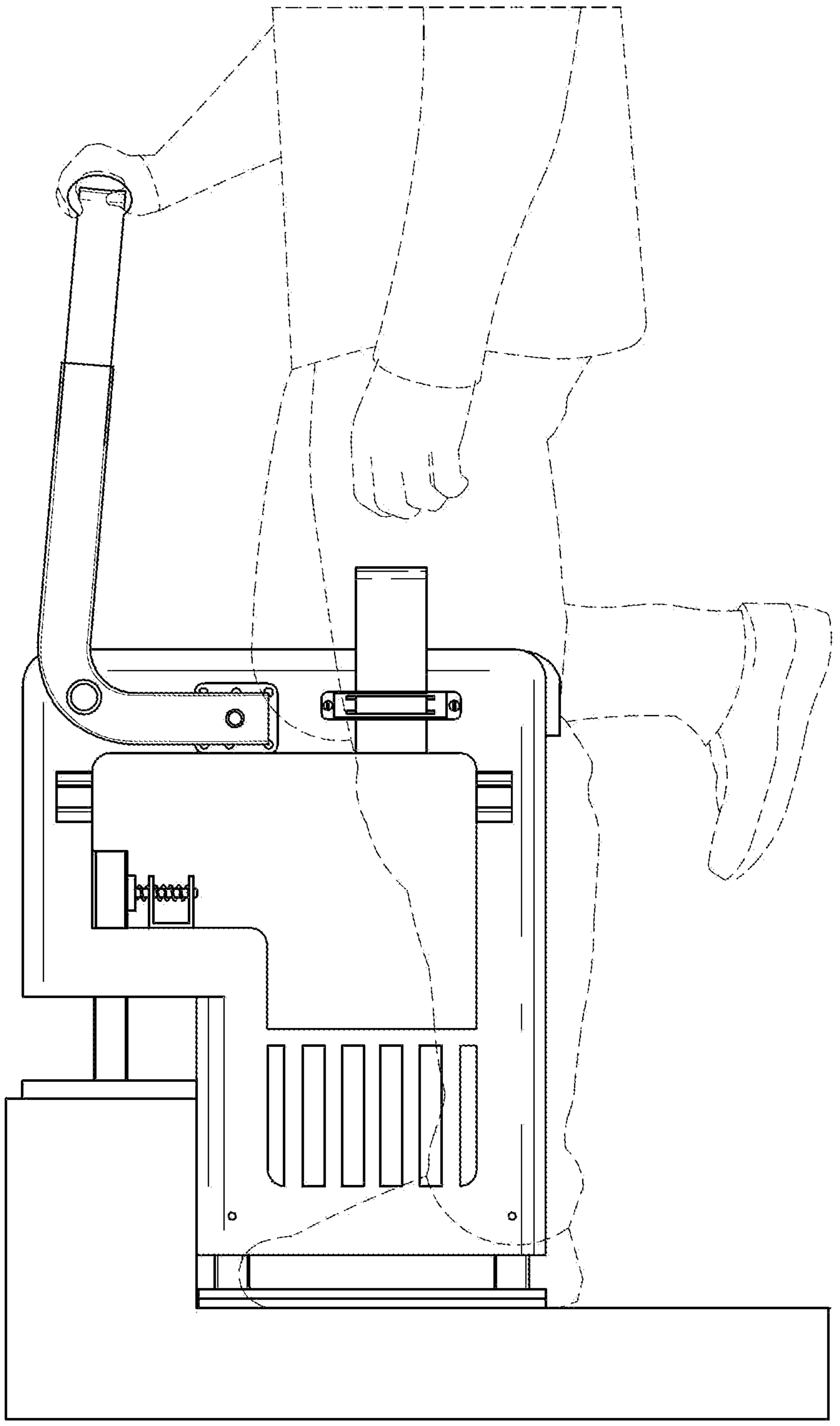
FIG. 14 is an illustration of the left side view of a second embodiment of the device, showing a user utilizing the device to ascend or descend a flight of stairs.

Referring now to FIG. 14, one embodiment of the present invention is provided as an illustrative example. FIG. 14 is an illustration of the left side view of the device 100, showing a user utilizing the device 100 to ascend or descend a flight of stairs. In FIG. 14, the device 100 is placed adjacent to the stairs with a user resting a knee and lower leg on the horizontal top surface 16. The vertical face 24 is placed against the side wall of a first stair step, the lower horizontal bottom surface 22 is placed on the top of the next stair step and the front vertical surface 20 is against the side wall of the next stair step, so the device 100 is stably placed on the stairs and the horizontal top surface 16 is substantially parallel to the level.

When ascending stairs, the user can place the device 100 stably on the stairs as illustrated in FIG. 14, with the lower horizontal surface 18 of the device 100 placed on the ground or a first step while the upper horizontal surface 22 of the device 100 placed on the next stair step. The user can stand on the ground or stairs with his or her stronger leg and place his or her injured leg on the horizontal top surface 16 of the device 100. The user grasps the handle 40 with, preferably, the hand on the same side of the injured leg to lift the device 100 and place it on the next higher stair step, while holding the handrail of the stairs with the other hand if a handrail is available. The user then raises the stronger leg to the same stair step. The user can repeat this process until reaching the end of the stairs.

When descending the stairs, the process is similar. The user can first rest the knee and lower leg on the horizontal top surface 16 of the device 100 and step down with the stronger leg first, then lift the device 100 with one hand by grasping the handle 40 and place the device 100 on the next lower stair step while holding the handrail of the stairs with the other hand if a handrail is available. The user can repeat this process until reaching the end of the stairs.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, further comprising a plurality of footings, said footings being positions on both the upper horizontal bottom surface and the lower horizontal bottom surface, wherein the footings are configured to have their height adjusted so that the relative vertical displacement between the lower horizontal bottom surface and the upper horizontal bottom surface approximates the vertical distance between plurality of steps on a set of stairs the user desires to ascend or descend, wherein said footings are configured to resist slipping, and wherein said handle is further comprised of a rigid portion and a flexible portion.

2. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, wherein said vertical face is configured to be approximately the height of the vertical distance between adjacent steps in a flight of stairs, further comprising a plurality of footings, said footings being positions on both the upper horizontal bottom surface and the lower horizontal bottom surface, wherein said footings are configured to have their height adjusted so that the relative vertical displacement between the lower horizontal bottom surface and the upper horizontal bottom surface approximates the vertical distance between plurality of steps on a set of stairs the user desires to ascend or descend, wherein said footings are configured to resist slipping, and wherein said handle is further comprised of a rigid portion and a flexible portion.

3. The apparatus of claim 2, further comprising a pad positioned on top of the horizontal top surface.

4. The apparatus of claim 3, wherein the horizontal top surface and the pad are configured such that a portion of the top of the pad is positioned below the top plane of the horizontal top surface.

5. The apparatus of claim 4, wherein the wherein the horizontal top surface and the pad are configured such that a portion of the users leg is positioned below the top plane of the horizontal top surface.

6. The apparatus of claim 3, further comprising a pad positioned on top of the horizontal top surface.

7. The apparatus of claim 6, wherein the horizontal top surface and the pad are configured such that a portion of the top of the pad is positioned below the top plane of the horizontal top surface.

8. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, and wherein the handle further comprises a hand grip pad.

9. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, and wherein the handle further comprises:

a top handle portion;

a bottom handle portion;

said top handle portion and said bottom handle portion configured to move relative to each other to adjust the height of the handle.

10. The apparatus of claim 9, further comprising a mechanism to maintain the height of the handle by maintaining the position of the top handle portion relative to the bottom handle portion.

11. The apparatus of claim 9, further comprising:

a hole in the top handle portion;

a hole in the bottom handle portion;

a pin;

a spring;

wherein the pin is configured fit into the holes in the top handle portion and in the bottom handle portion to substantially maintain the position of the top handle portion relative to the bottom handle portion to substantially maintain height of the handle while the apparatus is in use;

wherein components are further configured so that the pin can be compressed through the outermost hole to compresses the spring and to move the pin out of the hole to allow movement of the top handle portion and relative to the bottom handle portion to adjust the height of the handle.

12. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, and further comprising:

a pivot;

said handle configured to rotate around the pivot to adjust the angle of the handle relative to the horizontal top surface;

a fixing arrangement;

said fixing arrangement configured to substantially fix the angle of the handle relative to the horizontal top surface by substantially preventing rotation of the handle around the pivot while the fixing arrangement is engaged.

13. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, and further comprising:

a foot plate further comprising a non-slip surface;

leg slidably connected to the device;

a height adjustment mechanism further configured to maintain the leg and the foot plate at a substantially constant height relative to the apparatus while the apparatus is in use and further configured to allow the height of the foot plate and the leg to be adjusted when necessary.

14. An apparatus, comprising:

a horizontal top surface;

a vertical side;

a plurality of horizontal bottom surfaces configured to allow each of the horizontal bottom surfaces to rest on a different step of a flight of stairs;

a vertical face between the plurality of horizontal bottom surfaces;

at least one handle attached to the vertical side configured to allow the apparatus to be lifted while maintaining the horizontal top surface substantially parallel to the level;

wherein the apparatus is configured such that a user's knee can be rested on the horizontal top surface while using the apparatus to support the knees and lower leg and the handle can be used to lift the apparatus to a higher or lower step in the flight of stairs, further comprising:

a strap;

a locking device;

said strap and locking device configured to hold the leg of the user substantially in place relative to the apparatus while the apparatus is in use, and wherein the height adjustment mechanism is further comprising:

a pin;

a spring;

a moveable plate;

a hole in the leg;

wherein the pin is configured fit into the hole to hold the leg in position to substantially maintain the leg in a substantially fixed position to substantially maintain height of the foot plate relative to the horizontal bottom surface while the apparatus is in use;

wherein components are configured so that movement of the moveable plate relative to the leg compresses the spring and moves the pin out of the hole to allow movement of the leg and the foot plate relative to the horizontal bottom surface.

15. An apparatus, comprising:

a horizontal top surface;

a pad positioned on top of the horizontal top surface, wherein the horizontal top surface and the pad are configured such that a portion of the top of the pad is positioned below the top plane of the horizontal top surface, and wherein the wherein the horizontal top surface and the pad are configured such that a portion of the users leg is positioned below the top plane of the horizontal top surface;

a strap;

a locking device;

said strap and locking device configured to hold the leg of the user substantially in place relative to the apparatus while the apparatus is in use;

a vertical side;

an open space in a vertical side configured to allow a user to access a moveable plate of a height adjustment mechanism; and a plurality of horizontal bottom surfaces configured to allow each of the horizontal bottom surfaces to be above a different step of a flight of stairs;

a vertical face between the plurality of horizontal bottom surfaces wherein said vertical face is configured to be approximately the height of the vertical distance between adjacent steps in a flight of stairs;

a foot plate further comprising a non-slip surface;

leg slidably connected to the device;

a height adjustment mechanism further configured to maintain the leg and the foot plate at a substantially constant height relative to the apparatus while the apparatus is in use and further configured to allow the height of the foot plate and the leg to be adjusted when necessary;

said height adjustment mechanism further comprising:

a pin;

a spring;

a moveable plate;

a hole in the leg;

wherein the pin is configured fit into the hole to hold the leg in position to substantially maintain the leg in a substantially fixed position to substantially maintain height of the foot plate relative to the horizontal bottom surface while the apparatus is in use;

wherein components are configured so that movement of the moveable plate relative to the leg compresses the spring and moves the pin out of the hole to allow movement of the leg and the foot plate relative to the horizontal bottom surface at least one handle configured to allow the apparatus to be lifted while maintaining the horizontal top surface substantially parallel to the level, said handle further comprising:

a top handle portion;

a bottom handle portion;

said top handle portion and said bottom handle portion configured to move relative to each other to adjust the height of the handle;

a hole in the top handle portion;

a hole in the bottom handle portion;

a spring;

a pin, wherein the pin is configured fit into the holes in the top handle portion and in the bottom handle portion to substantially maintain the position of the top handle portion relative to the bottom handle portion to substantially maintain height of the handle while the apparatus is in use;

wherein components are further configured so that the pin can be compressed through the outermost hole to compresses the spring and to move the pin out of the hole to allow movement of the top handle portion and relative to the bottom handle portion to adjust the height of the handle;

a hand grip pad;

a pivot, said handle configured to rotate around the pivot to adjust the angle of the handle relative to the horizontal top surface;

a fixing arrangement configured to substantially fix the angle of the handle relative to the horizontal top surface by substantially preventing rotation of the handle around the pivot while the fixing arrangement is engaged wherein the apparatus is configured such that a user's knee can be rested on the horizontal top surface while using the apparatus to support the knees and lower leg and the handle can be used to lift the apparatus to a higher or lower step in the flight of stairs.

* * * * *